United States Patent
Saitou et al.

(10) Patent No.: US 12,013,459 B2
(45) Date of Patent: Jun. 18, 2024

(54) DISTANCE MEASURING DEVICE, DISTANCE MEASURING SYSTEM, DISTANCE MEASURING METHOD, AND PROGRAM

(71) Applicant: PANASONIC INTELLECTUAL PROPERTY MANAGEMENT CO., LTD., Osaka (JP)

(72) Inventors: Shigeru Saitou, Kyoto (JP); Motonori Ishii, Osaka (JP); Masato Takemoto, Osaka (JP); Shinzo Koyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 943 days.

(21) Appl. No.: 16/981,587

(22) PCT Filed: Mar. 6, 2019

(86) PCT No.: PCT/JP2019/008940
§ 371 (c)(1),
(2) Date: Sep. 16, 2020

(87) PCT Pub. No.: WO2019/181518
PCT Pub. Date: Sep. 26, 2019

(65) Prior Publication Data
US 2021/0033730 A1 Feb. 4, 2021

(30) Foreign Application Priority Data
Mar. 20, 2018 (JP) ................................ 2018-053552

(51) Int. Cl.
*G01S 17/10* (2020.01)
*G01S 7/481* (2006.01)
(Continued)

(52) U.S. Cl.
CPC ............ *G01S 17/10* (2013.01); *G01S 7/4816* (2013.01); *G01S 7/4868* (2013.01); *G01S 17/18* (2020.01); *G01S 17/89* (2013.01); *G01S 7/4873* (2013.01)

(58) Field of Classification Search
None
See application file for complete search history.

(56) References Cited

U.S. PATENT DOCUMENTS 3,947,119 A * 3/1976 Bamberg ................ G01S 17/18
348/31
5,298,905 A * 3/1994 Dahl ......................... G01S 7/34
342/127
(Continued)

FOREIGN PATENT DOCUMENTS

JP  S59-139521 A  8/1984
JP  2008-047925 A  2/2008
(Continued)

OTHER PUBLICATIONS

International Search Report and Written Opinion issued in International Patent Application No. PCT/JP2019/008940, dated May 28, 2019; with partial English translation.

*Primary Examiner* — Eric L Bolda
(74) *Attorney, Agent, or Firm* — Rimon P.C.

(57) ABSTRACT

A distance measuring device is to be connected to a wave transmitter and a wave receiver. The distance measuring device includes a distance measuring unit, which calculates a distance to the target based on a time interval between transmission of a measuring wave from a wave transmitter and reception of the measuring wave at a wave receiver. The target may be present across a preceding distance range and a succeeding distance range which are continuous with each other and both of which belong to a plurality of distance ranges defined by dividing a measurable distance range. In (Continued)

such a situation, the distance measuring unit calculates the distance to the target based on respective amounts of a preceding wave received at the wave receiver over a period corresponding to the preceding distance range and a succeeding wave received at the wave receiver over a period corresponding to the succeeding distance range.

11 Claims, 8 Drawing Sheets

(51) Int. Cl.
    *G01S 7/486*     (2020.01)
    *G01S 7/487*     (2006.01)
    *G01S 17/18*     (2020.01)
    *G01S 17/89*     (2020.01)

(56) References Cited

U.S. PATENT DOCUMENTS

| | | | |
|---|---|---|---|
| 6,057,909 A | 5/2000 | Yahav et al. | |
| 6,091,905 A | 7/2000 | Yahav et al. | |
| 7,212,278 B2 * | 5/2007 | Doemens | G01S 7/487 |
| | | | 356/5.03 |
| 7,554,652 B1 * | 6/2009 | Babin | G01S 17/18 |
| | | | 356/5.03 |
| 7,956,988 B1 | 6/2011 | Moran | |
| 2011/0313722 A1 * | 12/2011 | Zhu | G01S 17/933 |
| | | | 702/159 |
| 2015/0109414 A1 * | 4/2015 | Adam | H04N 13/296 |
| | | | 348/46 |
| 2016/0178734 A1 * | 6/2016 | Kawamura | G01S 7/4808 |
| | | | 356/5.01 |
| 2018/0203122 A1 * | 7/2018 | Grauer | G01S 17/89 |
| 2018/0329063 A1 | 11/2018 | Takemoto et al. | |
| 2019/0004149 A1 | 1/2019 | Mano et al. | |

FOREIGN PATENT DOCUMENTS

| | | |
|---|---|---|
| JP | 2010-066221 A | 3/2010 |
| JP | 2016-183922 A | 10/2016 |
| WO | 2017/110413 A1 | 6/2017 |
| WO | 2017/141957 A1 | 8/2017 |

* cited by examiner

DISTANCE MEASURING DEVICE, DISTANCE MEASURING SYSTEM, DISTANCE MEASURING METHOD, AND PROGRAM

CROSS-REFERENCE OF RELATED APPLICATIONS

This application is the U.S. National Phase under 35 U.S.C. § 371 of International Patent Application No. PCT/JP2019/008940, filed on Mar. 6, 2019, which in turn claims the benefit of Japanese Application No. 2018-053552, filed on Mar. 20, 2018, the entire disclosures of which Applications are incorporated by reference herein.

TECHNICAL FIELD

The present disclosure generally relates to a distance measuring device, a distance measuring system, a distance measuring method, and a program, and more particularly relates to a distance measuring device, a distance measuring system, a distance measuring method, and a program, all of which are configured or designed to measure the distance to a target.

BACKGROUND ART

A distance measuring device (also called a "rangefinder") has been known in the art which measures the distance to a target of measurement (hereinafter simply referred to as a "target") by the time of flight (TOF) technique (see, for example, Patent Literature 1). According to the TOF technique, the distance measuring device emits a light pulse toward the target of measurement, is exposed to the light reflected from the target of measurement at multiple exposure timings with multiple time delays defined in synch with the timings of emission, and calculates the distance to the target based on outputs at the respective exposure timings.

There has been an increasing demand for increasing the resolution of the distance measured by such a distance measuring device.

CITATION LIST

Patent Literature

Patent Literature 1: WO 2017/141957 A1

SUMMARY OF INVENTION

In view of the foregoing background, it is therefore an object of the present disclosure to provide a distance measuring device, a distance measuring system, a distance measuring method, and a program, all of which contribute to increasing the resolution of a distance measured.

A distance measuring device according to an aspect of the present disclosure is to be connected to a wave transmitter to transmit a measuring wave and a wave receiver to receive the measuring wave that has been reflected from a target. The distance measuring device includes a distance measuring unit. The distance measuring unit calculates a distance to the target based on a time interval between transmission of the measuring wave from the wave transmitter and reception of the measuring wave at the wave receiver. The target may be present across a preceding distance range and a succeeding distance range which are continuous with each other and both of which belong to a plurality of distance ranges defined by dividing a measurable distance range. In such a situation, the distance measuring unit calculates the distance to the target based on respective amounts of a preceding wave received at the wave receiver over a period corresponding to the preceding distance range and a succeeding wave received at the wave receiver over a period corresponding to the succeeding distance range.

A distance measuring system according to another aspect of the present disclosure includes: the distance measuring device described above; the wave transmitter; and the wave receiver.

A distance measuring method according to still another aspect of the present disclosure is a method for calculating a distance to a target based on a time interval between transmission of a measuring wave from a wave transmitter and reception of the measuring wave at a wave receiver. The target may be present across a preceding distance range and a succeeding distance range which are continuous with each other and both of which belong to a plurality of distance ranges defined by dividing a measurable distance range. In such a situation, according to the distance measuring method, the distance to the target is calculated based on respective amounts of a preceding wave received at the wave receiver over a period corresponding to the preceding distance range and a succeeding wave received at the wave receiver over a period corresponding to the succeeding distance range.

A program according to yet another aspect of the present disclosure is designed to cause a computer system to execute the distance measuring method described above.

DESCRIPTION OF EMBODIMENTS

Note that embodiments and their variations to be described below are only examples of the present disclosure and should not be construed as limiting. Rather, those embodiments and variations may be readily modified in various manners depending on a design choice or any other factor without departing from a true spirit and scope of the present disclosure.

(1) Overview

Figure 1:
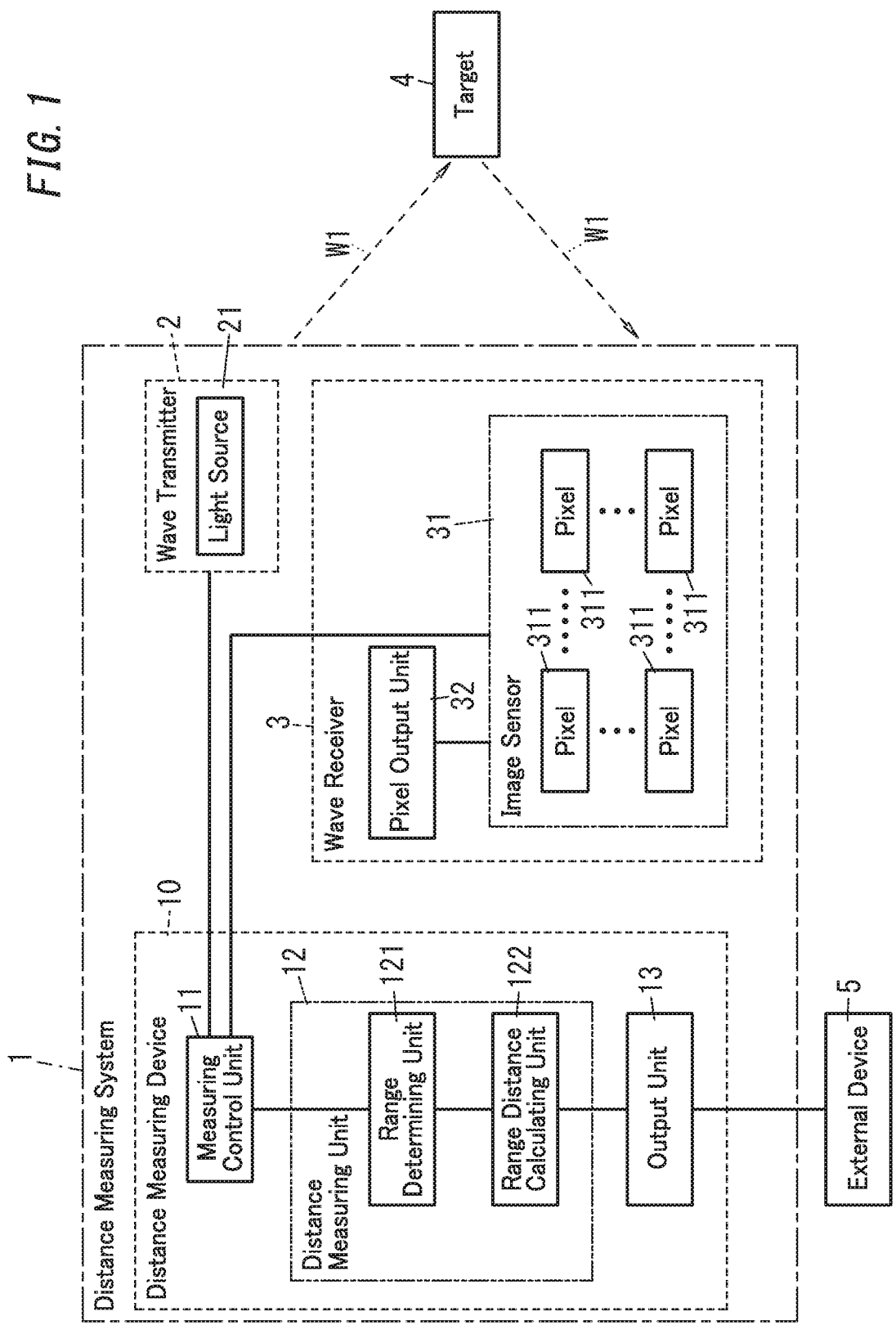
FIG. 1 is a block diagram illustrating a distance measuring system including a distance measuring device according to an exemplary embodiment of the present disclosure.

FIG. 1 is a block diagram illustrating a distance measuring device 10 and a distance measuring system 1 according to an exemplary embodiment.

The distance measuring system 1 includes a distance measuring device 10, a wave transmitter 2, and a wave receiver 3, and measures the distance to the target 4 by the time of flight (TOF) technique. The distance measuring system 1 is applicable for use in, for example, an object recognition system used as a piece of onboard equipment for cars to detect an obstacle, and a surveillance camera and a security camera for detecting an object (or a human), for instance.

The wave transmitter 2 is configured to transmit a measuring wave W1. The wave receiver 3 is configured to receive the measuring wave W1 that has been reflected from the target 4. The distance measuring device 10 is to be connected to the wave transmitter 2 and the wave receiver 3 and includes a distance measuring unit 12. The distance measuring unit 12 calculates the distance to the target 4 based on a time interval between the transmission of the measuring wave W1 from the wave transmitter 2 and the reception of the measuring wave W1 at the wave receiver 3. The target 4 may be present across a preceding distance range and a succeeding distance range which are continuous with each other among a plurality of distance ranges defined by dividing a measurable distance range. In such a situation, the distance measuring unit 12 calculates the distance to the target 4 based on respective amounts of a preceding wave received at the wave receiver 3 over a divisional period corresponding to the preceding distance range and a succeeding wave received at the wave receiver 3 over a divisional period corresponding to the succeeding distance range.

In the distance measuring device 10 and distance measuring system 1 according to this embodiment, when the target 4 is present across two distance ranges (namely, the preceding distance range and the succeeding distance range), the distance to the target 4 is calculated based on respective amounts of waves received over two periods respectively corresponding to the two distance ranges (namely, the amounts of the preceding and succeeding waves received). This allows the distance measuring device 10 and distance measuring system 1 according to this embodiment to measure the distance with higher resolution and on a unit shorter than the distance range, thus contributing to improving the measurement precision.

(2) Overall Configuration for Distance Measuring System (2.1) Wave Transmitter

The wave transmitter 2 includes a light source 21 and is configured to emit pulses of light as the measuring wave W1. That is to say, in this embodiment, the measuring wave W1 is light. In FIG. 1, the measuring wave W1 (light) is indicated conceptually by a dashed line. With this regard, when the distance is measured by the TOF technique, the light (measuring wave W1) suitably has a single wavelength, a relatively short pulse width, and a relatively high peak intensity. In addition, considering the use of the distance measuring system 1 (distance measuring device 10) in an urban area, for example, the wavelength of the light (measuring wave W1) suitably falls within the near-infrared wavelength range in which the luminosity factor is low to the human eye and which is less susceptible to ambient light coming from the sun. In this embodiment, the light source 21 is implemented as a laser diode, for example, and emits a pulsed laser beam. The intensity of the pulsed laser beam emitted from the light source 21 satisfies Class 1 or Class 2 of "Safety of Laser Products" standard (JIS C 6802) established in the country of Japan.

The wave transmitter 2 is subjected to light emission control by a measuring control unit 11 that the distance measuring device 10 includes. The light emission control will be described in detail later in the "(2.3.1) Measuring control unit" section.

Note that the light source 21 does not have to be a laser diode but may also be a light-emitting diode (LED), a vertical cavity surface emitting laser (VCSEL) diode, or a halogen lamp, for example. In addition, the light (measuring wave W1) may fall within a wavelength range different from the near infrared wavelength range.

Furthermore, the measuring wave W1 does not have to be light but may also be an ultrasonic wave, a radio wave, or any other type of wave as well.

(2.2) Wave Receiver

The wave receiver 3 includes an image sensor 31 and is configured to receive the measuring wave W1 (light), which is a reflected wave (reflected light) that has been sent out from the wave transmitter 2 and then reflected from the target 4. The image sensor 31 includes a plurality of pixels 311 serving as photosensitive elements. The plurality of pixels 311 are arranged two-dimensionally and able to receive the incoming light only when exposed to the light. Each of the plurality of photosensitive elements of the image sensor 31 corresponds to a single pixel 311. Each pixel 311 may be a photodiode, for example. Each pixel 311 transduces the light received (as the measuring wave W1) into an electrical signal (hereinafter also referred to as a "pixel signal"). The wave receiver 3 further includes a pixel output unit 32 for outputting the pixel signal to the distance measuring device 10. In this embodiment, the wave receiver 3 includes the plurality of pixels 311, and therefore, the pixel output unit 32 outputs a plurality of pixel signals corresponding to the plurality of pixels 311. The signal level of each pixel signal has a value representing the amount of the light (measuring wave W1) received by its associated pixel 311 (i.e., the amount of the waves received). Optionally, each pixel 311 may also be implemented as an avalanche photodiode (APD). When each pixel 311 is implemented as an avalanche photodiode, the signal level of the pixel signal corresponds to the number of pulses (i.e., the number of photons) of the light received by the pixel 311.

As can be seen, the wave receiver 3 according to this embodiment includes the plurality of pixels 311 and the pixel output unit 32. The plurality of pixels 311 are arranged two-dimensionally to receive the measuring wave W1. The pixel output unit 32 outputs pixel signals based on the amounts of the measuring waves W1 received by the respective pixels 311.

The wave receiver 3 is subjected to light reception control by the measuring control unit 11 that the distance measuring device 10 includes. The light reception control will be described in detail later in the "(2.3.1) Measuring control unit" section.

In addition, the wave receiver 3 includes the image sensor 31 with the plurality of pixels 311. This allows the distance measuring device 10 (or the distance measuring system 1) to carry out data analysis such as image processing and recognition processing by using the pixel signals.

Note that the wave receiver 3 does not have to include the image sensor 31 with the plurality of pixels 311 but may also include a single pixel 311 (as a photosensitive element). Optionally, the wave receiver 3 may further include an optical system such as a lens. The wave receiver 3 may further include a filter for either cutting off, or transmitting, light with a particular frequency. This allows information about the frequency of the light to be acquired.

(2.3) Distance Measuring Device

The distance measuring device 10 includes the measuring control unit 11, the distance measuring unit 12, and an output unit 13.

(2.3.1) Measuring Control Unit

The measuring control unit 11 is configured to perform the light emission control on the wave transmitter 2 and perform the light reception control on the wave receiver 3. The measuring control unit 11 may be implemented, for example, as a microcomputer including a processor and a memory. That is to say, the measuring control unit 11 may be implemented as a computer system including a processor and a memory. The computer system performs the function of the measuring control unit 11 by making the processor execute an appropriate program. The program may be stored in advance in the memory or may also be downloaded via a telecommunications line such as the Internet or distributed after having been stored in a non-transitory storage medium such as a memory card.

In performing the light emission control on the wave transmitter 2, the measuring control unit 11 controls the timing for the light source 21 to emit the light (hereinafter referred to as a "light emission timing"), the pulse width (emission time) of the light emitted from the light source 21, and other parameters. In performing the light reception control on the wave receiver 3, the measuring control unit 11 controls the timing to expose the plurality of pixels 311 to light (hereinafter referred to as an "exposure timing"), an exposure width (exposure time), and other parameters.

Figure 2:
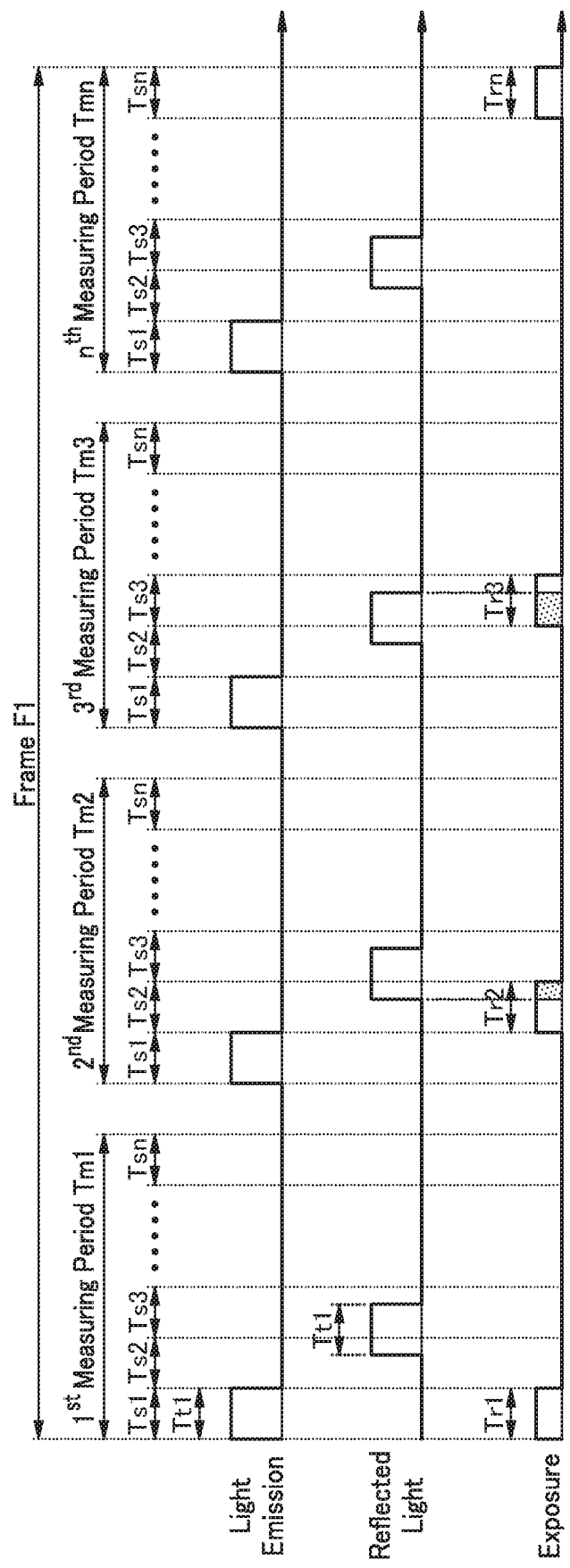
FIG. 2 illustrates how the distance measuring device works.

Specifically, the measuring control unit 11 makes the light source 21 emit the light a number of times over a period of time corresponding to a single distance measuring session (hereinafter referred to as a "frame F1") (see FIG. 2). The number of times the light is emitted in a single frame F1 is as large as the number of distance ranges defined by dividing the measurable distance range for the distance measuring system 1 (or the distance measuring device 10). A single frame F1 includes a plurality of measuring periods Tm (namely, the first measuring period Tm1 through the $n^{th}$ measuring period Tmn). The number of the measuring periods Tm in a single frame F1 is as large as the number of distance ranges. In addition, each single measuring period Tm is divided into a plurality of divisional periods (namely, the first divisional period through the $n^{th}$ divisional period). The plurality of divisional periods Ts correspond one to one to the plurality of distance ranges. Each divisional period Ts may have a time length (duration) of 10 ns, for example.

The measuring control unit 11 instructs the light source 21 to emit light in the initial divisional period Ts (first divisional period Ts1) of each measuring period Tm. In this embodiment, the light emission duration Tt1 in a single light emission session is as long as (i.e., has the same time length as) one divisional period Ts. However, this is only an example of the present disclosure and should not be construed as limiting. Alternatively, the light emission duration Tt1 and one divisional period Ts may have mutually different time lengths.

In addition, the measuring control unit 11 has the wave receiver 3 exposed to light in any of the plurality of divisional periods Ts of each measuring period Tm. Specifically, the measuring control unit 11 sequentially shifts, with respect to each measuring period Tm, the timing to have the wave receiver 3 exposed one by one (i.e., on a divisional period basis) from the first divisional period Ts1 through the $n^{th}$ divisional period Tsn. That is to say, over a single frame F1, the wave receiver 3 is exposed to light in every one of the plurality of divisional periods Ts. In this embodiment, the exposure duration Tr1 in a single exposure session has the same time length as one divisional period Ts. However, this is only an example of the present disclosure and should not be construed as limiting. Alternatively, the exposure duration Tr1 and one divisional period Ts may have mutually different time lengths as well.

That is to say, in each measuring period Tm, one light emission session and one exposure session are performed. The time interval between the light emission timing and the exposure timing changes from one measuring period Tm to another. Therefore, supposing the number of the plurality of distance ranges is n, the number of times of light emission sessions per frame F1 and the number of times of exposure sessions per frame F1 are both n. If the number of frames F1 per second is f, then the number of times of light emission sessions per second and the number of times of exposure sessions per second are given by f×n.

The wave receiver 3 is able to receive the wave reflected from the target 4 (i.e., reflected light) only when exposed to light. The time interval between the emission of light from the wave transmitter 2 and the reception of the reflected light at the wave receiver 3 varies according to the distance from the distance measuring system 1 (wave transmitter 2 and wave receiver 3) to the target 4. If the distance from the distance measuring system 1 to the target 4 is d and the velocity of light is c, then the reflected light will arrive at the wave receiver 3 when an amount of time t=2d/c passes since the wave transmitter 2 has emitted light (i.e., since the beginning of the measuring period Tm). This allows the distance to the target 4 to be calculated based on the time interval between the emission of light from the wave transmitter 2 and the reception of the reflected light at the wave receiver 3. Also, the measurable distance range is given by n×Ts×c/2, based on the time length of each divisional period Ts.

(2.3.2) Distance Measuring Unit

The distance measuring unit 12 is configured to calculate the distance to the target 4 depending on the divisional period Ts in which the wave receiver 3 has received the reflected wave (reflected light), out of the plurality of divisional periods Ts. The distance measuring unit 12 may be implemented, for example, as a microcomputer including a processor and a memory. That is to say, the distance measuring unit 12 may be implemented as a computer system including a processor and a memory. The distance measuring unit 12 performs the functions of a range determining unit 121 and a range distance calculating unit 122 by making the processor execute an appropriate program. The program may be stored in advance in the memory or may also be downloaded via a telecommunications line such as the Internet or distributed after having been stored in a non-transitory storage medium such as a memory card.

The range determining unit 121 determines, by the signal levels of the pixel signals in the plurality of divisional periods Ts corresponding one to one to the plurality of distance ranges, in what distance range the target 4 should be currently present, among the plurality of distance ranges. With this regard, depending on the distance from the distance measuring system 1 to the target 4, the target 4 may be present across two distance ranges. In the following description, one of the two distance ranges will be hereinafter referred to as a "preceding distance range" and the other distance range that follows the preceding distance range will be hereinafter referred to as a "succeeding distance range." In addition, the range distance calculating unit calculates the distance to the target 4 based on the amount of preceding waves received at the wave receiver 3 over a period corresponding to the preceding distance range and the amount of succeeding waves received at the wave receiver 3 over a period corresponding to the succeeding distance range.

Figure 3:
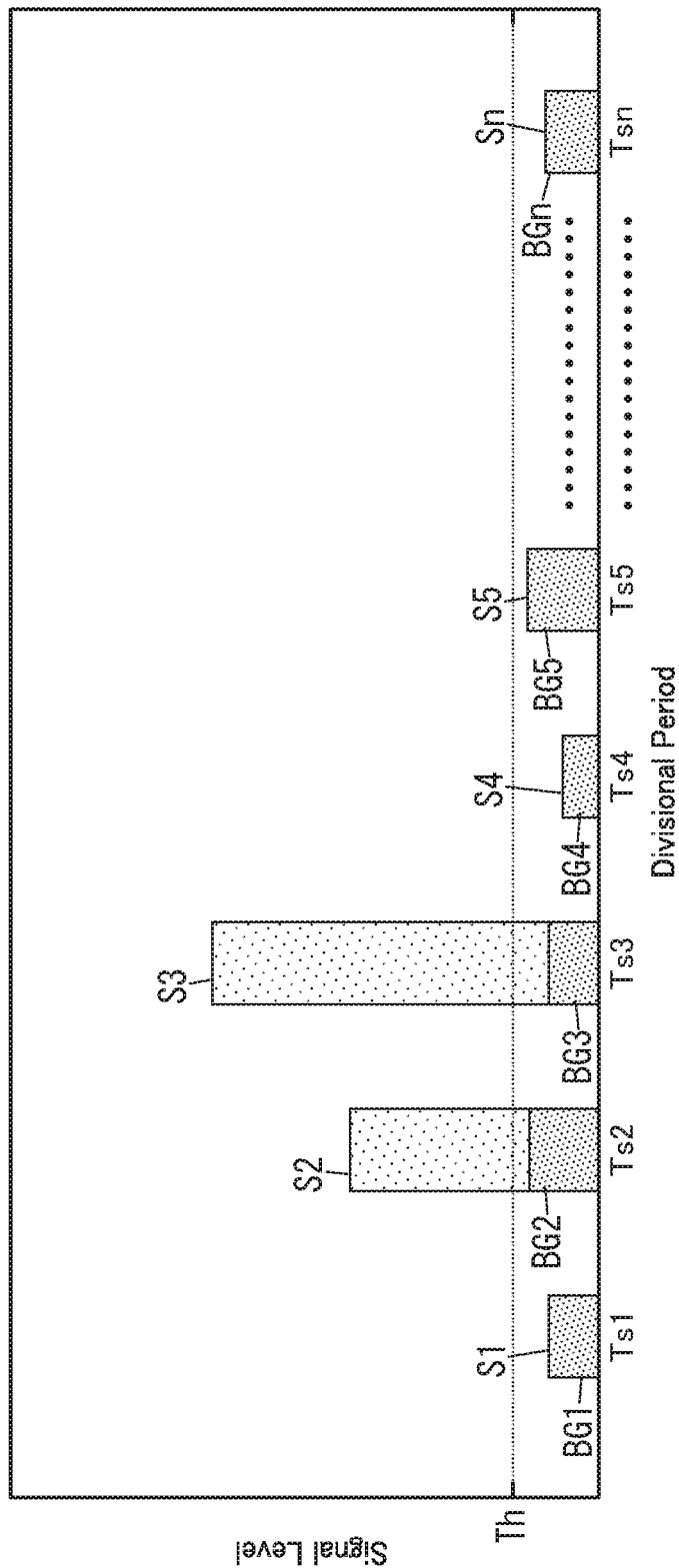
FIG. 3 is a graph showing how the signal level of a pixel signal changes over a plurality of divisional periods.

FIG. 3 shows exemplary signal levels of pixel signals in the plurality of divisional periods Ts (namely, from the first divisional period Ts1 through the $n^{th}$ divisional period Tsn). The range determining unit 121 determines, by comparing the signal level of the pixel signal in each divisional period Ts with a threshold value Th, whether the target 4 should be present or not in its corresponding distance range. Specifically, the range determining unit 121 determines a distance range, in which the amount of the waves received at the wave receiver 3 (which is represented by the signal level of the pixel signal) over a corresponding period is equal to or greater than the threshold value Th, out of the plurality of distance ranges, to be a distance range in which the target 4 should be present.

In this case, the signal level of the pixel signal includes a background level. As used herein, the "background level" refers to a signal component representing light other than the reflected light (measuring wave W1) and may be a signal component representing light such as reflected light of the sunlight, light projected from street lamps, and light emitted from headlights of cars. Therefore, the background level varies according to the measuring environment.

The range determining unit 121 sets the threshold value Th based on the background level. In the following description, the background levels for the first through $n^{th}$ divisional periods Ts1-Tsn will be hereinafter designated by BG1-BGn, respectively. The signal levels of the pixel signals for the first through $n^{th}$ divisional periods Ts1-Tsn will be hereinafter designated by S1-Sn, respectively.

The range determining unit 121 calculates the average Av and standard deviation σ of all signal levels S1-Sn of the pixel signals for the plurality of divisional periods Ts but the highest signal level (e.g., the signal level S3 in the example shown in FIG. 3) and the second highest signal level (e.g., the signal level S2 in the example shown in FIG. 3). Then, the range determining unit 121 sets the sum of the average Av and standard deviation σ thus calculated as the threshold value Th (as represented by the following Equation (1)):

$$Th = Av + \sigma = (\Sigma Sn - (S2+S3))/(n-2) + \sigma \quad (1)$$

This reduces, if the target 4 is not present within the measurable distance range (including the plurality of distance ranges), the chances of the signal level of the pixel signal corresponding to each divisional period Ts, i.e., the background level, exceeding the threshold value Th, thus reducing erroneous detection. Note that the threshold value Th does not have to be the value described above. Alternatively, the sum of the average Av and the standard deviation σ multiplied by 3 (i.e., 3σ) may be set as the threshold value Th (=Av+3σ).

The range determining unit 121 extracts, from the plurality of divisional periods Ts, a divisional period Ts in which the signal level is equal to or greater than the threshold value Th and is the highest and another divisional period Ts in which the signal level is equal to or greater than the threshold value Th and which is adjacent to the divisional period Ts with the highest signal level. When finding the signal level equal to or greater than the threshold value in both of the two divisional periods Ts that are adjacent to the divisional period Ts with the highest signal level, the range determining unit 121 extracts one divisional period Ts having the higher signal level out of the two adjacent divisional periods Ts. In the example shown in FIG. 3, the third divisional period Ts3 has the highest signal level that is equal to or greater than the threshold value Th. Also, of the second and fourth divisional periods Ts2, Ts4 that are adjacent to the third divisional period Ts3, the second divisional period Ts2 has the higher signal level that is equal to or greater than the threshold value Th. Thus, the range determining unit 121 extracts the third divisional period Ts3 and the second divisional period Ts2. The range determining unit 121 determines, out of the plurality of distance ranges, the second distance range (preceding distance range) corresponding to the second divisional period Ts2 extracted and the third distance range (succeeding distance range) corresponding to the third divisional period Ts3 extracted to be a distance range in which the target 4 should be present. On the other hand, when finding the signal level less than the threshold value in both of the two divisional periods Ts that are adjacent to the divisional period Ts with the highest signal level, the range determining unit 121 determines that the target 4 should be present in the distance range corresponding to the divisional period Ts with the highest signal level.

Figure 4:
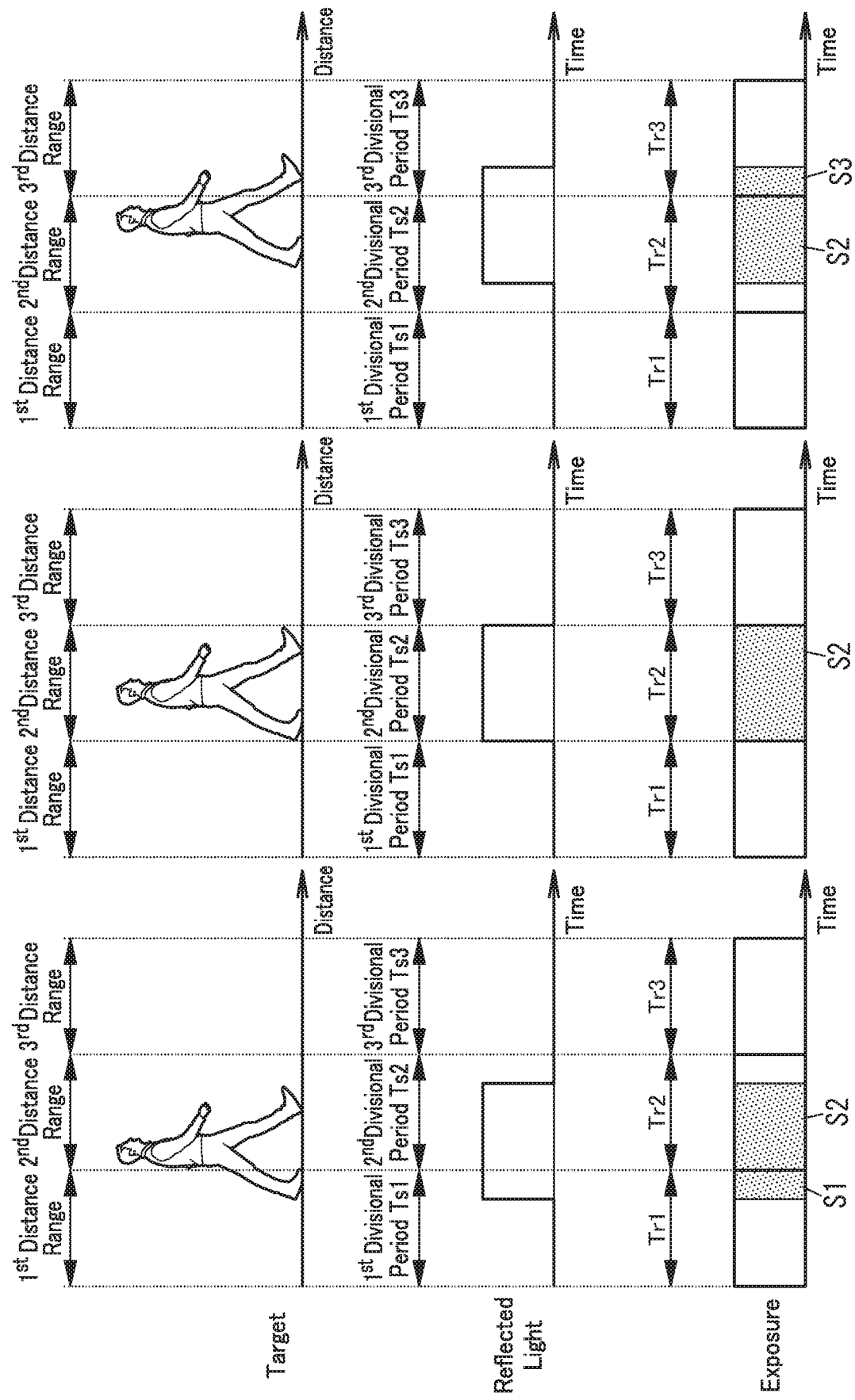
FIGS. 4A-4C show how the signal level of a pixel signal changes in distance ranges where a human is present.

The range distance calculating unit 122 calculates, depending on the distance range in which the range determining unit 121 has determined the target 4 should be present, the distance to the target 4. Next, it will be described with reference to FIGS. 4A-7 specifically how the range distance calculating unit 122 calculates the distance to the target 4. In the example illustrated in FIGS. 4A-4C, the target 4 is a human and the signal level of the pixel signal is shown with respect to the distance ranges Where the human is present.

In FIG. 4A, the human is present across the first distance range (preceding distance range) and the second distance range (succeeding distance range) and most of his or her body is located in the second distance range with only a part of his or her body located in the first distance range. Thus, the reflected light arrives at the wave receiver 3 in both the first divisional period Ts1 corresponding to the first distance range and the second divisional period Ts2 corresponding to the second distance range. In respective parts of the first and second divisional periods Ts1 and Ts2, the wave receiver 3 receives the reflected light and the first signal level S1 in the first divisional period Ts1 and the second signal level S2 in the second divisional period Ts2 are equal to or greater than the threshold value Th. In addition, since most of the human's body is located in the second distance range, the ratio of a period in which the reflected light is received to the overall second divisional period Ts2 is larger than the ratio of a period in which the reflected light is received to the overall first divisional period Ts1. Thus, in the example illustrated in FIG. 4A, the second signal level S2 in the second divisional period Ts2 corresponding to the second distance range (succeeding distance range) is larger than the first signal level S1 in the first divisional period Ts1 corresponding to the first distance range (preceding distance range) (i.e., S2>S1 is satisfied).

In the example illustrated in FIG. 4B, the human is present entirely in the second distance range. Thus, in the second divisional period Ts2 corresponding to the second distance range, the reflected light arrives at the wave receiver 3. In the second divisional period Ts2, the wave receiver 3 receives the reflected light. Consequently, only the second signal level S2 in the second divisional period Ts2 corresponding to the second distance range is equal to or greater than the threshold value Th.

In FIG. 4C, the human is present across the second distance range (preceding distance range) and the third distance range (succeeding distance range) and most of his or her body is located in the second distance range with only a part of his or her body located in the third distance range. Thus, the reflected light arrives at the wave receiver 3 in both of the second divisional period Ts2 corresponding to the second distance range and the third divisional period Ts3 corresponding to the third distance range. In respective parts of the second and third divisional periods Ts2 and Ts3, the wave receiver 3 receives the reflected light and the second signal level S2 in the second divisional period Ts2 and the third signal level S3 in the third divisional period Ts3 are equal to or greater than the threshold value Th. In addition, since most of the human's body is located in the second distance range, the ratio of a period in which the reflected light is received to the overall second divisional period Ts2 is larger than the ratio of a period in which the reflected light is received to the overall third divisional period Ts3. Thus, in the example illustrated in FIG. 4C, the second signal level S2 in the second divisional period Ts2 corresponding to the second distance range (preceding distance range) is larger than the third signal level S3 in the third divisional period. Ts3 corresponding to the third distance range succeeding distance range) (i.e., S2>S3 is satisfied).

The range distance calculating unit 122 calculates the distance to the target 4 based on the range number of the distance range where the range determining unit 121 has determined the target 4 should be present. As used herein, the "range number" refers to the (ordinal) number of the distance range where the range determining unit 121 has determined the target 4 should be present on the supposition that the distance range closest to the distance measuring system 1 (or the distance measuring device 10) is the first distance range. In the example illustrated in FIG. 4B, the human (as the target 4) is present only in the second distance range, and therefore, the range number is the second. Meanwhile, if the target 4 is present across two distance ranges, then the ordinal number of the preceding distance range is the range number. In the example illustrated in FIG. 4A, the human (as the target 4) is present across the first distance range and the second distance range, the preceding distance range is the first distance range, and therefore, the range number is the first. In the example illustrated in FIG. 4C, the human (as the target 4) is present across the second distance range and the third distance range, the preceding distance range is the second distance range, and therefore, the range number is the second.

If the number of the distance ranges where the range determining unit 121 has determined the target 4 should be present turns out to be one (see FIG. 4B), then the range distance calculating unit 122 calculates the distance d to the target 4 based on the range number and the length L1 of the distance range (=c×Ts/2) (as given by the following Equation (2)):

$$d=(N-0.5) \times L1 = (N-0.5) \times c \times Ts/2 \qquad (2)$$

where c is the velocity of light and N is the range number.

For example, if the time length of the divisional period Ts is 10 ns, then the length of the distance range is approximately 1.5 m. Thus, if the range number is the second, then the distance d to the target 4 is approximately 2.25 m. Meanwhile, if the number n of the distance ranges is 100, for example, then the measurable distance range is 150 m (=n×L1).

Furthermore, if the number of the distance ranges where the range determining unit 121 has determined the target 4 should be present is two (see FIGS. 4A and 4C), then the range distance calculating unit 122 calculates the distance to the target 4 by further correcting the value obtained by multiplying the range number by the length of the distance range.

Specifically, the range distance calculating unit 122 compares a signal level representing the amount of preceding waves received corresponding to the preceding distance range (hereinafter referred to as a "preceding signal level Sf") with a signal level representing the amount of succeeding waves received corresponding to the succeeding distance range (hereinafter referred to as a "succeeding signal level Sb") to calculate either a correction factor α or a correction factor β. When finding the succeeding signal level Sb (e.g., the signal level S2 in FIG. 4A) higher than the preceding signal level Sf (e.g., the signal level S1 in FIG. 4A) as shown in FIG. 4A (i.e., when Sb>Sf is satisfied), the range distance calculating unit 122 calculates the correction factor α. On the other hand, when finding the preceding signal level Sf (e.g., the signal level S2 in FIG. 4C) higher than the succeeding signal level Sb (e.g., the signal level S3 in FIG. 4C) as shown in FIG. 4C (i.e., when Sf>Sb is satisfied), the range distance calculating unit 122 calculates the correction factor β.

The range distance calculating unit 122 calculates either the correction factor α or the correction factor β based on the ratio of the preceding signal level Sf and the succeeding signal level Sb (hereinafter sometimes referred to as a "range signal ratio R"). In this case, if the higher one of the preceding and succeeding signal levels Sf, Sb is designated by Sh and the lower one of the preceding and succeeding signal levels Sf, Sb is designated by Sl, then the range signal ratio R is given by (Sh−Sl)/(Sh+Sl). Optionally, in this case, the signal levels Sh, Sl may be calculated by subtracting the average Av from the preceding signal level Sf and the succeeding signal level Sb.

First, a situation where the succeeding signal level Sb is higher than the preceding signal level Sf will be described (see FIG. 4A).

Figure 5:
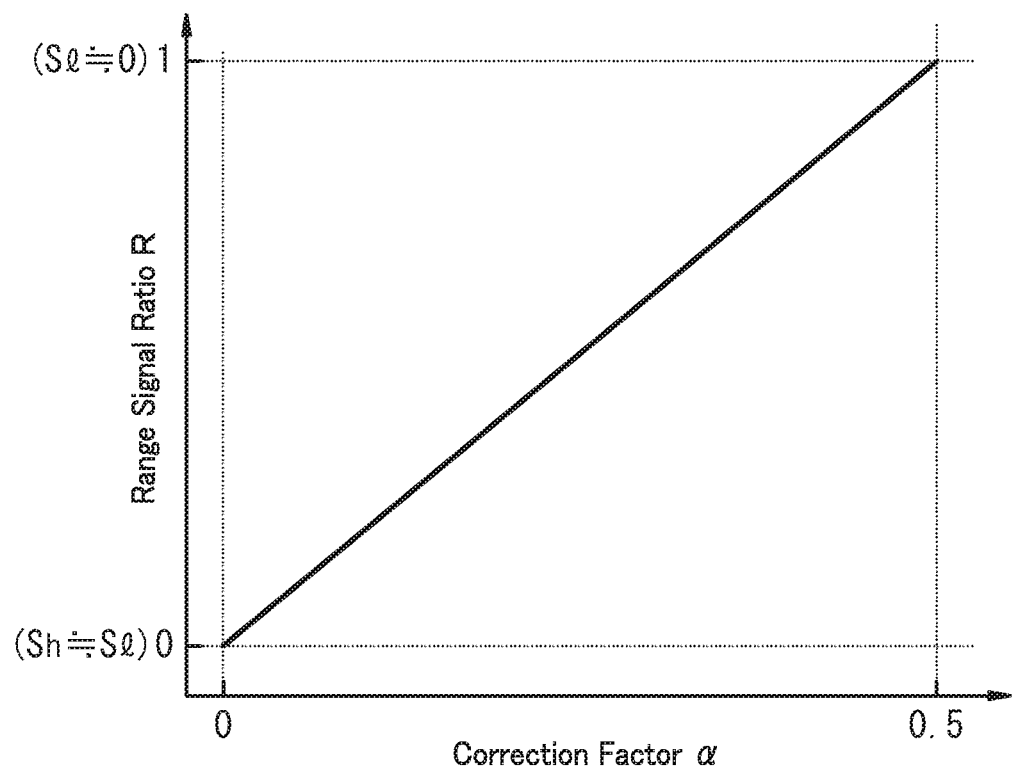
FIG. 5 is a graph showing how a range signal ratio changes with a correction factor $\alpha$.

FIG. 5 is a graph showing an exemplary relationship between the correction factor α and the range signal ratio R. In the example illustrated in FIG. 5, the relationship between the correction factor α and the range signal ratio R is represented by a positive linear function and the correction factor α is R/2. The correction factor α is calculated when the succeeding signal level Sb is higher than the preceding signal level Sf. Thus, in this case, the range signal ratio R is given by (Sb−Sf)/(Sb+Sf) and is a value greater than zero but less than one (i.e., 0<R<1 is satisfied). Consequently, the correction factor α is a value greater than zero and less than 0.5 (i.e., 0<α<0.5 is satisfied).

If the succeeding signal level Sb is higher than the preceding signal level Sf, then the range distance calculating unit 122 calculates the distance d to the target 4 by the following Equation (3) based on the range number N, the length L1 of the distance range, and the correction factor α:

$$D = N \times L1 + \alpha \times L1 \qquad (3)$$

In the example illustrated in FIG. 4A, if the time length T1 of each divisional period Ts is 10 ns, then the distance d to the target 4 varies according to the range signal ratio R within the range from about 1.5 m to about 2.25 m (i.e., 1.5<d<2.25 is satisfied) because the length L1 of the distance range is approximately 1.5 m and the range number is the first.

Next, a situation where the preceding signal level Sf is higher than the succeeding signal level Sb will be described (see FIG. 4C).

Figure 6:
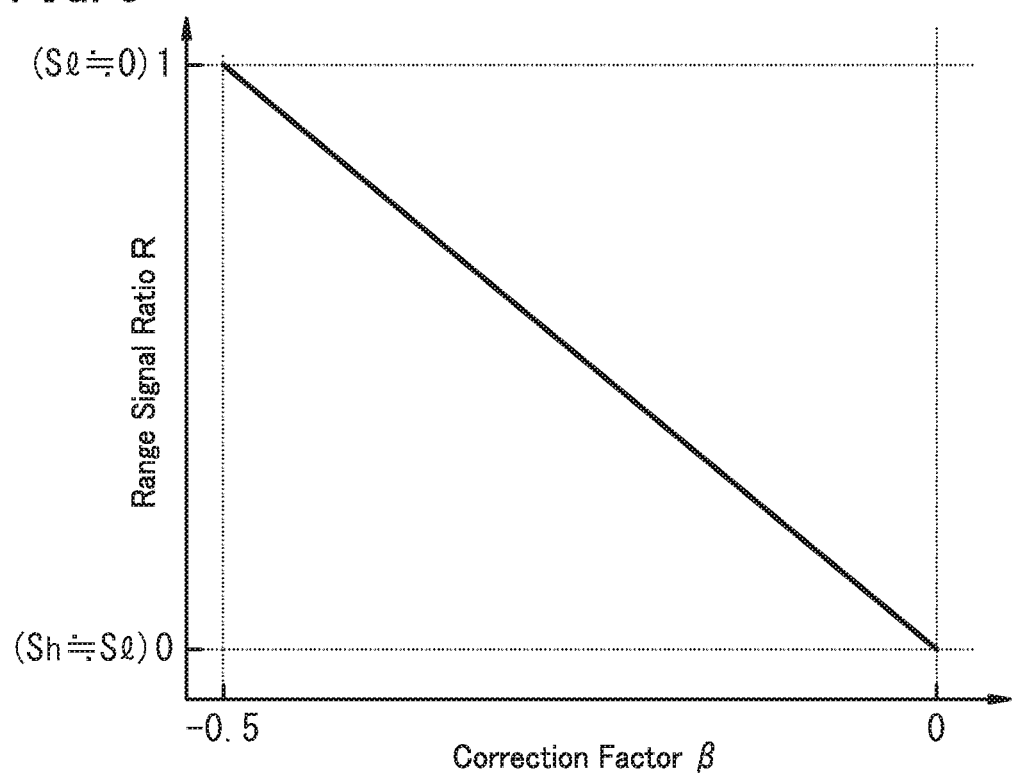
FIG. 6 is a graph showing how a range signal ratio changes with a correction factor $\beta$.

FIG. 6 is a graph showing an exemplary relationship between the correction factor β and the range signal ratio R. In the example illustrated in FIG. 6, the relationship between the correction factor β and the range signal ratio R is represented by a negative linear function and the correction factor β is −R/2. The correction factor β is calculated when the preceding signal level Sf is higher than the succeeding signal level Sb. Thus, in this case, the range signal ratio R is given by (Sf−Sb)/(Sf−Sb) and is a value greater than zero but less than one (i.e., 0<R<1 is satisfied). Consequently, the correction factor is a value greater than −0.5 and less than 0 (i.e., −0.5<β<0 is satisfied).

If the preceding signal level Sf is higher than the succeeding signal level Sb, then the range distance calculating unit 122 calculates the distance d to the target 4 by the following Equation (4) based on the range number N, the length L1 of the distance range, and the correction factor β:

$$d = N \times L1 + \beta \times L1 \quad (4)$$

As can be seen, according to this embodiment, the distance measuring unit 12 calculates the distance to the target 4 based on the ratio (i.e., the range signal ratio R) of the amount of preceding waves received (preceding signal level Sf) and the amount of succeeding waves received (succeeding signal level Sb).

In the example illustrated in FIG. 4C, if the time length T1 of each divisional period Ts is 10 ns, then the distance d to the target 4 varies according to the range signal ratio R within the range from about 2.25 m to about 3.0 m (i.e., 2.25<d<3.0 is satisfied) because the length L1 of the distance range is approximately 1.5 m and the range number is the second.

The range determining unit 121 and the range distance calculating unit 122 perform the arithmetic processing described above repeatedly on a frame F1 by frame F1 basis. Thus, in the distance measuring device 10 (distance measuring system 1) according to this embodiment, the distance to the target 4 is calculated on a frame F1 basis. That is to say, in this embodiment, the cycle time in which the pixel output unit 32 outputs the pixel signal for each of the plurality of distance ranges is one frame F1. The distance measuring unit 12 calculates the distance to the target 4 on a frame F1 basis.

Figure 7:
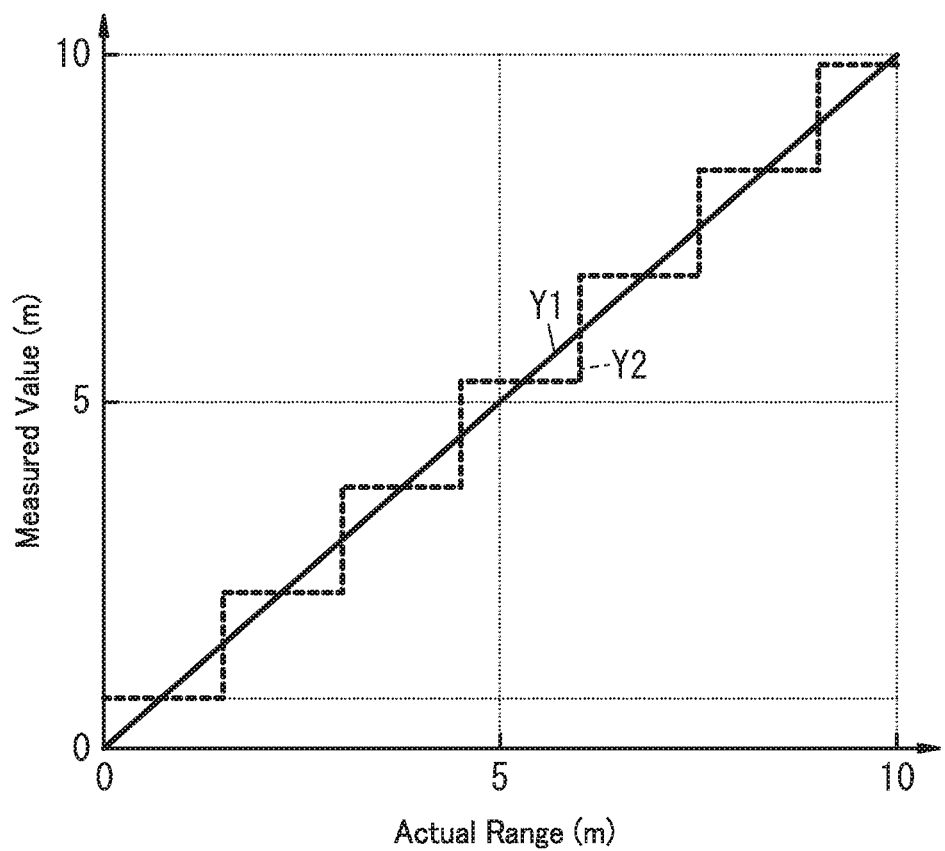
FIG. 7 is a graph showing a relationship between an actual distance and a measured value.

FIG. 7 is a graph showing a relationship between an actual distance [m] to the target 4 and a measured value (calculated value) [m] obtained by the range distance calculating unit 122 of the distance measuring device 10 according to this embodiment. In FIG. 7, Y1 is a graph showing the measured value obtained by (the range distance calculating unit 122 of) the distance measuring device 10 according to this embodiment with respect to the actual distance to the target 4, and Y2 is a graph showing the measured value obtained by a distance measuring device according to a comparative example with respect to the actual distance to the target 4. The distance measuring device according to the comparative example calculates (measures) the distance to the target 4 based on the range number of the distance range having the highest signal level among the plurality of distance ranges and the length of each distance range. That is to say, the distance measuring device according to the comparative example calculates the distance to the target 4 based on the range number. Thus, the measured values change stepwise and an error of at most 0.75 m is generated between the measured value and the actual distance (as indicated by the graph Y2). In contrast, when determining that the target 4 should be present across two distance ranges, the distance measuring device 10 according to this embodiment corrects the distance based on the range number by using the ratio of the respective signal levels of the two distance ranges (i.e., the range signal ratio R). This allows the distance measuring device 10 according to this embodiment to reduce the difference between the value calculated by the range distance calculating unit 122 and the actual distance. That is to say, the distance measuring device 10 according to this embodiment contributes to increasing the resolution of the distance measured and improving the measurement precision.

(2.3.3) Output Unit

The output unit 13 is configured to output the measurement result, i.e., the distance to the target 4 as calculated by (the range distance calculating unit 122 of) the distance measuring unit 12, to an external device 5.

Examples of the external device 5 include display devices such as liquid crystal displays and organic electroluminescent (EL) displays. The output unit 13 outputs the measurement result of the distance measuring unit 12 to the external device 5, thereby making the external device 5 present the measurement result obtained by the distance measuring unit 12. Alternatively, the output unit 13 may output image data generated by the pixel signal to the external device 5 to make the external device 5 display the image data. Note that the external device 5 does not have to be a display device but may also be any other type of device.

(3) Distance Measuring Method

The same function as that of the distance measuring device 10 may also be implemented as a distance measuring method. The distance measuring method is a method for calculating the distance to a target 4 based on a time interval between the emission of light (i.e., transmission of the measuring wave W1) from the wave transmitter 2 and the reception of the light (i.e., reception of the measuring wave W1) at the wave receiver 3. The target 4 may be present across a preceding distance range and a succeeding distance range which are continuous with each other among a plurality of distance ranges defined by dividing a measurable distance range. In such a situation, according to the distance measuring method, the distance to the target 4 is calculated based on a preceding signal level (i.e., the amount of preceding waves received) at the wave receiver 3 over a period corresponding to the preceding distance range and a succeeding signal level (i.e., the amount of succeeding waves received) at the wave receiver 3 over a period corresponding to the succeeding distance range.

Figure 8:
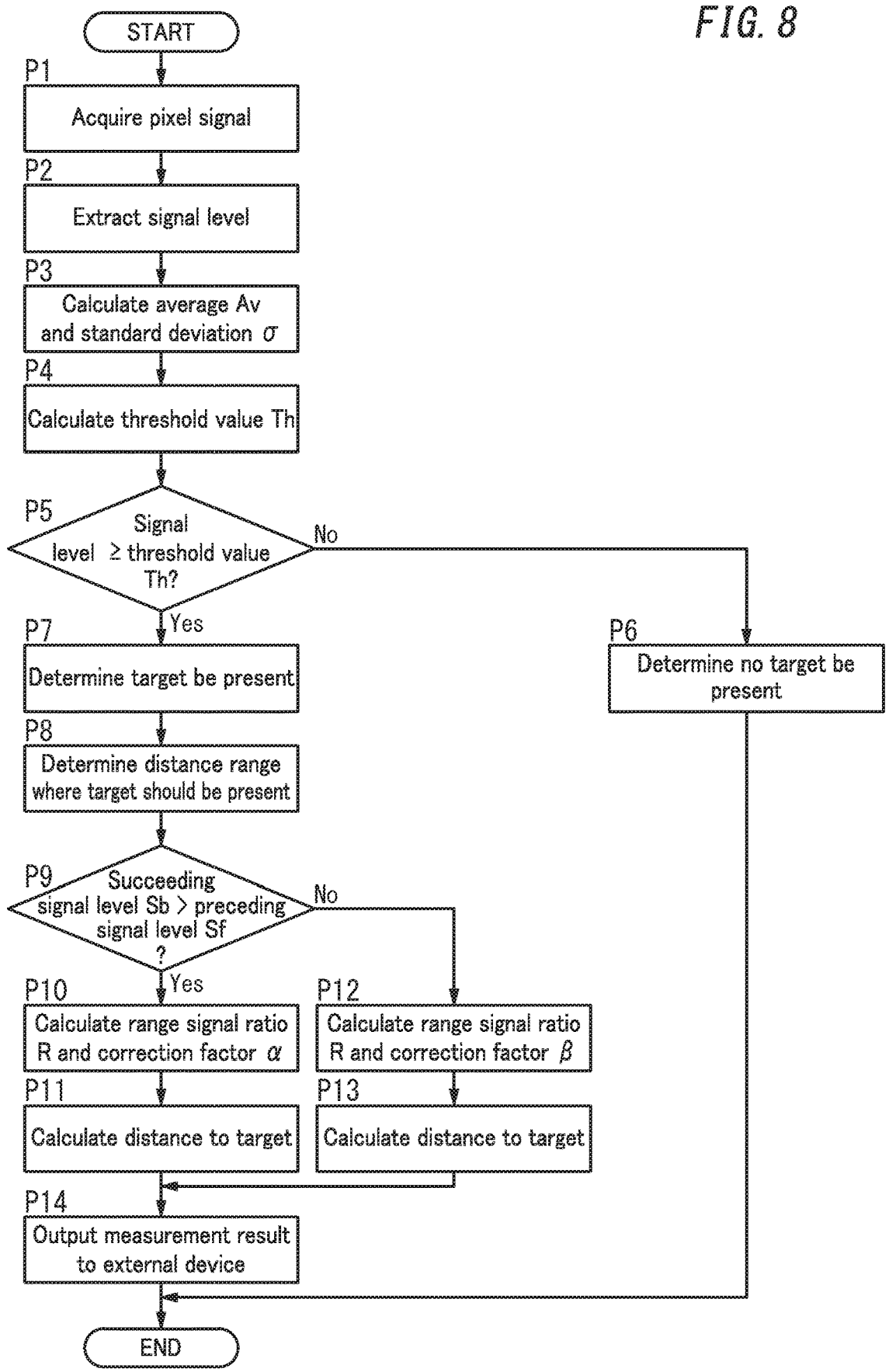
FIG. 8 is a flowchart showing how the distance measuring device operates.

Next, the distance measuring method will be described in detail with reference to FIG. 8.

The distance measuring unit 12 acquires a plurality of pixel signals corresponding to a plurality of divisional periods Ts from the wave receiver 3 (in P1).

The range determining unit 121 of the distance measuring unit 12 extracts the signal level of a pixel signal in each of the plurality of divisional periods Ts in a single frame F1 (in P2).

The range determining unit 121 calculates the average Av and standard deviation σ of all signal levels of the pixel signals for the plurality of divisional periods Ts but the highest signal level and the second highest signal level (in P3).

The range determining unit 121 calculates a threshold value Th based on the average Av and the standard deviation σ (in P4).

The range determining unit 121 compares the signal level of the pixel signal in each divisional period Ts with the threshold value Th (in P5). When finding the signal level of the pixel signal in each divisional period Ts less than the threshold value Th (if the answer is NO in P5), the range determining unit 121 determines that the target 4 should be absent from the measurable distance range (in PC). On the other hand, when finding any pixel signal, of which the signal level is equal to or greater than the threshold value Th, among the pixel signals for the plurality of divisional periods Ts (if the answer is YES in P5), the range determining unit 121 determines that the target 4 should be present within the measurable distance range (in P7). The range determining unit 121 determines in what distance range the target 4 should be present, among the plurality of distance ranges (in P8). In this example, the target 4 is supposed to be present across two distance ranges (namely, a preceding distance range and a succeeding distance range).

The range distance calculating unit 122 compares the preceding signal level Sf corresponding to the preceding distance range with the succeeding signal level Sb corresponding to the succeeding distance range (in P9).

When finding the succeeding signal level Sb higher than the preceding signal level Sf (if the answer is YES in P9), the range distance calculating unit 122 calculates the range signal ratio R and the correction factor α (in P10). The range distance calculating unit 122 calculates the distance to the target 4 by using the range number N and the correction factor α (in P11).

On the other hand, when finding the preceding signal level Sf higher than the succeeding signal level Sb (if the answer is NO in P9), the range distance calculating unit 122 calculates the range signal ratio R and the correction factor β (in P12). The range distance calculating unit 122 calculates the distance to the target 4 by using the range number N and the correction factor β (in P13).

The output unit 13 outputs the result of calculation obtained by the range distance calculating unit 122 (i.e., the distance to the target 4) to the external device 5 (in P14).

Alternatively, the distance measuring method may also be implemented as a (computer) program or a non-transitory storage medium that stores the program thereon. The program is designed to cause the computer system to execute the distance measuring method.

The distance measuring device 10 includes a computer system in its distance measuring unit 12, for example. In that case, the computer system may include, as principal hardware components, a processor and a memory. The functions of the distance measuring unit 12 (including the range determining unit 121 and the range distance calculating unit 122) may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation. Optionally, the functions of the distance measuring device 10 may be implemented as a cloud computing system as well.

(4) Variations

Note that the embodiment described above is only an exemplary one of various embodiments of the present disclosure and should not be construed as limiting. Rather, the exemplary embodiment described above may be readily modified in various manners depending on a design choice or any other factor without departing from the scope of the present disclosure. Next, variations of the distance measuring device 10 and distance measuring system 1 according to the exemplary embodiment will be enumerated one after another. Note that the variations to be described below may be adopted in combination as appropriate.

(4.1) First Variation

In the example described above, the wave transmitter 2 is configured to transmit the measuring wave W1 (emit light) once a measuring period Tm. However, this is only an example of the present disclosure and should not be construed as limiting. Alternatively, the wave transmitter 2 may transmit the measuring waves W1 multiple times a measuring period Tm.

Figure 9:
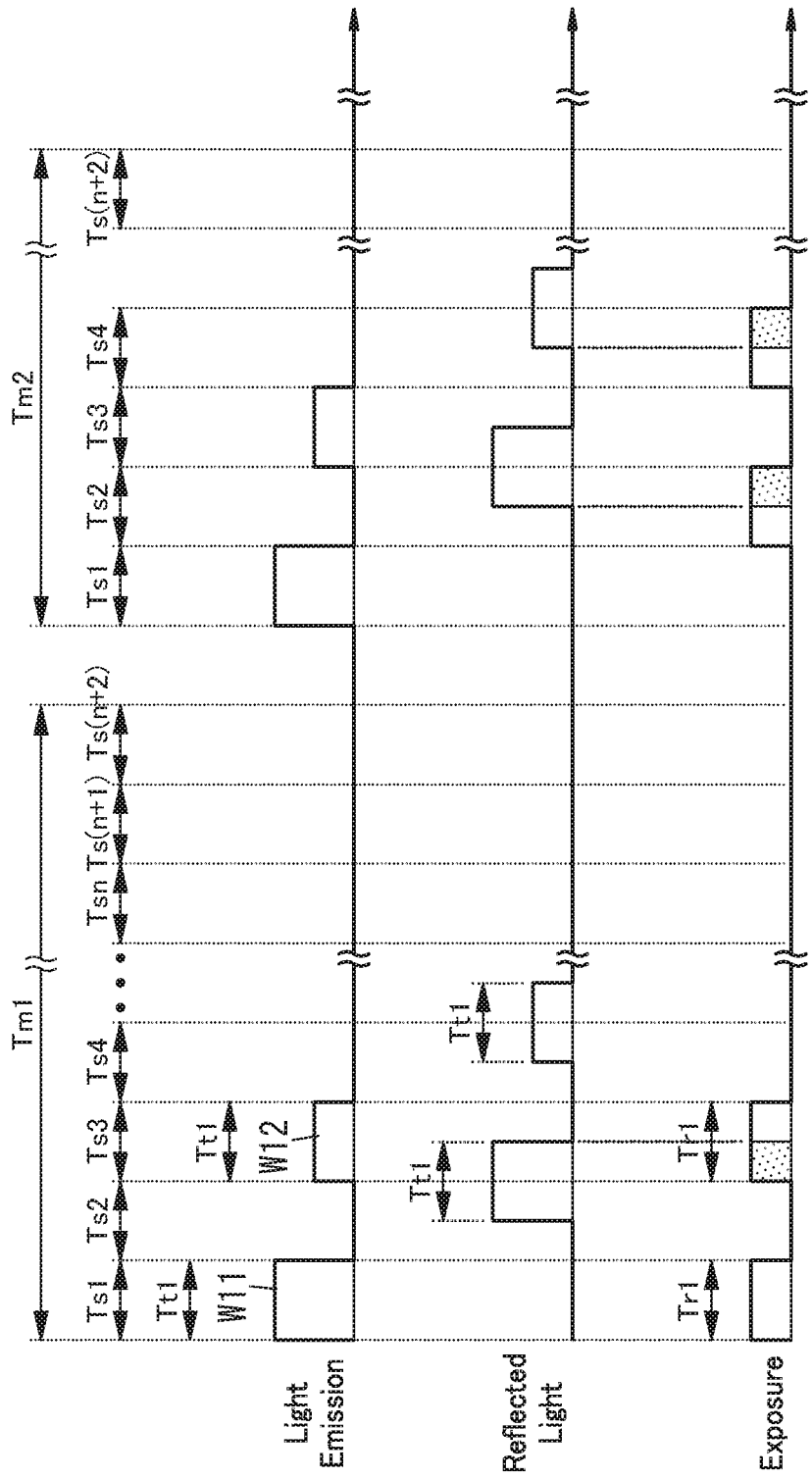
FIG. 9 illustrates how a distance measuring device according to a first variation of the exemplary embodiment of the present disclosure operates.

In this variation, the wave transmitter 2 is configured to transmit the measuring waves W1 twice a measuring period Tm (see FIG. 9). Of the two measuring waves W1 to be transmitted every measuring period Tm, the measuring wave W1 to be transmitted first will be hereinafter referred to as a "first measuring wave W11" and the measuring wave W1 to be transmitted next will be hereinafter referred to as a "second measuring wave W12."

In this variation, the wave transmitter 2 transmits, as the measuring waves W1, a first measuring wave W11 and a second measuring wave W12 with mutually different transmitted wave strengths. The range determining unit 121 determines, based on the amount of the first measuring wave W11 received at the wave receiver 3, the preceding distance range and the succeeding distance range. The range distance calculating unit 122 calculates the distance to the target 4 based on the amount of the second measuring wave W12 received as the preceding wave at the wave receiver 3 over a period corresponding to the preceding distance range and the amount of the second measuring wave W12 received as the succeeding wave at the wave receiver 3 over a period corresponding to the succeeding distance range.

The first measuring wave W11 and the second measuring wave W12 have mutually different transmitted wave strengths (emission intensities). Specifically, the first measuring wave W11 has a higher transmitted wave strength than the second measuring wave W12. In other words, the first measuring wave W11 has a higher emission intensity than the second measuring wave W12. For example, the ratio of the transmitted wave strength of the first measuring wave W11 to that of the second measuring wave W12 may be nine to one. However, this ratio is only an example and should not be construed as limiting.

In each measuring period Tm, the first measuring wave W11 is transmitted in the first divisional period Ts1 and the second measuring wave W12 is transmitted in the third divisional period Ts3. That is to say, the second measuring wave W12 will be transmitted when two divisional periods Ts pass since the start of transmission of the first measuring wave W11. In other words, the timing to start transmitting the first measuring wave W11 and the timing to start transmitting the second measuring wave W12 are shifted from each other by two divisional periods Ts. However, this is only an example of the present disclosure and should not be construed as limiting. Alternatively, the timing to start transmitting the first measuring wave W11 and the timing to start transmitting the second measuring wave W12 may also be shifted from each other by three or more divisional periods Ts.

Furthermore, according to this variation, the wave receiver 3 is configured to receive the measuring waves W1 (i.e., be exposed to the light emitted) twice a measuring period Tm. Of the two wave receptions in each measuring period Tm, the wave reception to be performed first will be hereinafter referred to as "first wave reception" and the wave reception to be performed next will be hereinafter referred to as "second wave reception." The interval between the first and second wave receptions is as long as the interval between the first measuring wave W11 and the second measuring wave W12.

The measuring control unit 11 sequentially shifts the timing to perform the first wave reception by one divisional period Ts from the first divisional period Ts1 through the $n^{th}$ divisional period Tsn in each of the plurality of measuring periods Tm, and also sequentially shifts the timing to perform the second wave reception by one divisional period Ts from the third divisional period Ts3 through the $(n+2)^{th}$ divisional period Ts(n+2). Thus, if the wave receiver 3 receives the measuring waves W1 at the time of both the first and second wave receptions, then the first measuring wave W11 that has been reflected from the target 4 will be received at the time of the first wave reception and the second measuring wave W12 that has been reflected from the target 4 will be received at the time of the second wave reception. Note that in the second wave reception, the third divisional period Ts3 through the $(n+2)^{th}$ divisional period Ts(n+2) respectively correspond to the first distance range through the $n^{th}$ distance range. For example, if the target 4 is present in the second distance range, then the wave receiver 3 will receive the second measuring wave W12 in the fourth divisional period Ts4.

In this case, the signal level of the pixel signal output from the wave receiver 3 has a value corresponding to the amount of the waves received. When the amount of the waves received exceeds a predetermined value, the signal level of the pixel signal will be saturated, i.e., will reach the upper limit value. For example, when the distance to the target 4 is relatively short or when the reflectance of the target 4 is high, the signal level of the pixel signal tends to be high enough to be saturated easily. Even when the signal level of the pixel signal is saturated, the range determining unit 121 is still able to determine the distance range where the target 4 should be present. However, when the signal level of the pixel signal is saturated, the range distance calculating unit 122 is no longer able to calculate the range signal ratio R accurately.

In this variation, two measuring waves W1 (namely, the first measuring wave W11 and the second measuring wave W12) are transmitted per measuring period Tm and the transmitted wave strength of the second measuring wave W12 is lower than that of the first measuring wave W11. Thus, the signal level of the pixel signal when the wave receiver 3 receives the second measuring wave W12 (hereinafter also referred to as a "second pixel signal") is lower, and tends to be saturated less easily, than the signal level of the pixel signal when the wave receiver 3 receives the first measuring wave W11 (hereinafter also referred to as a "first pixel signal").

In this variation, the range determining unit 121 determines, based on the signal level of the first pixel signal, in what distance range the target 4 should be present among the plurality of distance ranges. The range distance calculating unit 122 calculates the range signal ratio R and the correction factor α or β based on the signal level of the second pixel signal, thereby calculating the distance to the target 4. This allows the range distance calculating unit 122 to calculate the range signal ratio R accurately according to this variation, thus improving the accuracy of calculating the distance to the target 4.

Optionally, the range distance calculating unit 122 may calculate, only when the signal level of the first pixel signal is saturated, the distance to the target 4 based on the signal level of the second pixel signal. In other words, unless the signal level of the first pixel signal is saturated, the range distance calculating unit 122 calculates the range signal ratio R and the correction factor α or β based on the signal level of the first pixel signal, thereby calculating the distance to the target 4.

Optionally, only the first measuring wave W11 may be transmitted in each measuring period Tm and only when the signal level of the first pixel signal is saturated, the second measuring wave W12 may be transmitted in each measuring period Tm in the next frame F1. In that case, in the frame F1 in which the first pixel signal is transmitted, the range determining unit 121 determines, based on the signal level of the first pixel signal, the distance range where the target 4 should be present. In the frame F1 in which the second pixel signal is transmitted, the range distance calculating unit 122 calculates the range signal ratio R and the correction factor α or β based on the signal level of the second pixel signal, thereby calculating the distance to the target 4.

(4.2) Second Variation

In the example described above, the relationship between the correction factor α and the range signal ratio R is represented by the positive linear function (see FIG. 5) and the relationship between the correction factor β and the range signal ratio R is represented by the negative linear function (see FIG. 6). This is done on the supposition that the measuring wave W1 is a square wave. However, the actual measuring wave W1 may have a rounded or distorted rising or falling edge. In that case, the relationship between the range signal ratio R and the correction factor α, β is represented by an $n^{th}$ order function (where n>2). Specifically, the $n^{th}$ order function representing the relationship between the range signal ratio R and the correction factor α or β is set based on the relationship between the intensity of the light (measuring wave W1) emitted from the wave transmitter 2 and a time response spectrum. This allows the correction factor α, β to be calculated based on the waveform of the measuring wave W1, thus improving the accuracy of calculating the distance to the target 4.

(4.3) Third Variation

In the example described above, the threshold value Th to be compared with the signal level of the pixel signal in each of the plurality of divisional periods Ts corresponding to the plurality of distance ranges is supposed to be constant. However, this is only an example of the present disclosure and should not be construed as limiting. Alternatively, the threshold value Th may vary according to the distance ranges.

The signal level of the pixel signal when the wave receiver 3 receives the measuring wave W1 that has been reflected from the target 4 is relatively high if the target 4 is located in a relatively near distance range and is relatively low if the target 4 is located in a relatively far distance range.

Thus, in this variation, the threshold value Th is set such that the farther the distance from the wave receiver 3 to a given distance range is, the smaller the threshold value Th for the distance range is. For example, the threshold value Th may be set by correcting the sum of the average Av and the standard deviation σ with a range factor based on the range number. As used herein, the "range number" refers to the (ordinal) number of the distance range where the range determining unit 121 has determined the target 4 should be present on the supposition that the distance range closest to the distance measuring system 1 (or the distance measuring device 10) is the first distance range. The value of the range factor increases as the range number decreases. That is to say, the Value of the range factor decreases as the range number increases. Thus, the shorter the distance from the wave receiver 3 to a given distance range is (i.e., the smaller the range number of the distance range is), the larger the threshold value Th is. The longer the distance from the wave receiver 3 to a given distance range is (i.e., the larger the range number of the distance range is), the smaller the threshold value Th is.

This reduces the chances of the range determining unit 121 erroneously determining the distance range where the target 4 should be present.

(5) Resume

A distance measuring device (10) according to a first aspect is to be connected to a wave transmitter (2) to transmit a measuring wave (W1) and a wave receiver (3) to receive the measuring wave (W1) that has been reflected from a target (4). The distance measuring device (10) includes a distance measuring unit (12). The distance measuring unit (12) calculates a distance to the target (4) based on a time interval between transmission of the measuring wave (W1) from the wave transmitter (2) and reception of the measuring wave (W1) at the wave receiver (3). The target (4) may be present across a preceding distance range and a succeeding distance range which are continuous with each other among a plurality of distance ranges defined by dividing a measurable distance range. In such a situation, the distance measuring unit (12) calculates the distance to the target (4) based on respective amounts of a preceding wave received at the wave receiver (3) over a period corresponding to the preceding distance range and a succeeding wave received at the wave receiver (3) over a period corresponding to the succeeding distance range.

According to this aspect, when the target (4) is present across two distance ranges (namely, the preceding distance range and the succeeding distance range), the distance to the target (4) is calculated based on respective amounts of waves received over two periods respectively corresponding to the two distance ranges (namely, the amounts of the preceding and succeeding waves received). This allows the distance measuring device (10) to measure the distance with higher resolution and on a unit shorter than the distance range, thus contributing to improving the measurement precision.

In a distance measuring device (10) according to a second aspect, which may be implemented in conjunction with the first aspect, the measuring wave (W1) is light.

This aspect reduces measurement errors to be caused by the surrounding environment.

In a distance measuring device (10) according to a third aspect, which may be implemented in conjunction with the first or second aspect, the wave receiver (3) includes a plurality of pixels (311) and a pixel output unit (32). The plurality of pixels (311) are arranged two-dimensionally and receive the measuring wave (W1). The pixel output unit (32) outputs a pixel signal based on an amount of the measuring wave (W1) received by each of the plurality of respective pixels (311).

This aspect allows targets (4) in various shapes to be detected.

In a distance measuring device (10) according to a fourth aspect, which may be implemented in conjunction with the third aspect, the distance measuring unit (12) calculates, by defining that a cycle time in which the pixel output unit (32) outputs a plurality of the pixel signals corresponding to the respective distance ranges is one frame (F1), the distance to the target (4) on a frame (F1) basis.

This aspect contributes to increasing the resolution of distance measurement without decreasing the frame rate.

In a distance measuring device (10) according to a fifth aspect, which may be implemented in conjunction with any one of the first to fourth aspects, the distance measuring unit (12) calculates the distance to the target (4) based on a ratio of the respective amounts of the preceding and succeeding waves received.

This aspect allows the distance to be measured with higher resolution and on a unit shorter than the distance range, thus contributing to improving the measurement precision.

In a distance measuring device (10) according to a sixth aspect, which may be implemented in conjunction with any one of the first to fifth aspects, the distance measuring unit (12) includes a range determining unit (121) and a range distance calculating unit (122). The range determining unit (121) determines the preceding distance range and the succeeding distance range, across which the target (4) is present, among the plurality of distance ranges. The range distance calculating unit (122) calculates the distance to the target (4) based on the respective amounts of the preceding and succeeding waves received.

This aspect allows the distance to be measured with higher resolution and on a unit shorter than the distance range, thus contributing to improving the measurement precision.

In a distance measuring device (10) according to a seventh aspect, which may be implemented in conjunction with the sixth aspect, the range determining unit (121) determines a particular one of the plurality of distance ranges, in which the amount of the waves received at the wave receiver (3) over a period corresponding to the particular distance range is equal to or greater than a threshold value (Th), to be the particular distance range in which the target (4) is present.

This aspect reduces erroneous detection of the target (4).

In a distance measuring device (10) according to an eighth aspect, which may be implemented in conjunction with the seventh aspect, the threshold value (Th) varies from one of the plurality of distance ranges to another such that the longer the distance from the wave receiver (3) to a distance range is, the smaller the threshold value (Th) for the distance range is.

This aspect reduces erroneous determination of the distance range in which the target (4) should be present.

In a distance measuring device (10) according to a ninth aspect, which may be implemented in conjunction with any one of the sixth to eighth aspects, the wave transmitter (2) transmits, as the measuring wave (W1), a first measuring wave (W11) and a second measuring wave (W12) that have mutually different transmitted wave strengths. The range determining unit (121) determines the preceding distance range and the succeeding distance range based on the amount of the first measuring wave (W11) received at the wave receiver (3). The range distance calculating unit (122) calculates the distance to the target (4) based on the amount of the second measuring wave (W12) received as the preceding wave at the wave receiver (3) over a period corresponding to the preceding distance range and the amount of the second measuring wave (W12) received as the succeeding wave at the wave receiver (3) over a period corresponding to the succeeding distance range.

This aspect reduces saturation of the amount of the second measuring wave (W12) received, thus improving the accuracy of the distance to the target (4) calculated.

A distance measuring system (1) according to a tenth aspect includes: the distance measuring device (10) according to any one of the first to ninth aspects; the wave transmitter (2); and the wave receiver (3).

This aspect allows the distance to be measured with higher resolution and on a unit shorter than the distance range, thus contributing to improving the measurement precision.

A distance measuring method according to an eleventh aspect is a method for calculating a distance to a target (4) based on a time interval between transmission of a measuring wave (W1) from a wave transmitter (2) and reception of the measuring wave (W1) at the wave receiver (3). The target (4) may be present across a preceding distance range and a succeeding distance range which are continuous with each other among a plurality of distance ranges defined by dividing a measurable distance range. In such a situation, according to the distance measuring method, the distance to the target (4) is calculated based on respective amounts of a preceding wave received at the wave receiver (3) over a period corresponding to the preceding distance range and a succeeding wave received at the wave receiver (3) over a period corresponding to the succeeding distance range.

This aspect allows the distance to be measured with higher resolution and on a unit shorter than the distance range, thus contributing to improving the measurement precision.

A program according to a twelfth aspect is designed to cause a computer system to execute the distance measuring method according to the eleventh aspect.

This aspect allows the distance to be measured with higher resolution and on a unit shorter than the distance range, thus contributing to improving the measurement precision.

REFERENCE SIGNS LIST

1 Distance Measuring System
10 Distance Measuring Device
12 Distance Measuring Unit
121 Range Determining Unit
122 Range Distance Calculating Unit
2 Wave Transmitter
3 Wave Receiver
311 Pixel
32 Pixel Output Unit
4 Target
W1 Measuring Wave
W11 First Measuring Wave
W12 Second Measuring Wave
F1 Frame
Th Threshold Value

The invention claimed is:

1. A distance measuring device to be connected to a wave transmitter configured to transmit a measuring wave and a wave receiver configured to receive the measuring wave that has been reflected from a target, the distance measuring device comprising
 a distance measuring unit configured to calculate a distance to the target based on a time interval between transmission of the measuring wave from the wave transmitter and reception of the measuring wave at the wave receiver,
 the distance measuring unit being configured to, when the target is present across a preceding distance range and a succeeding distance range which are continuous with each other and both of which belong to a plurality of distance ranges defined by dividing a measurable distance range, calculate the distance to the target based on an amount of a preceding wave received at the wave receiver and an amount of a succeeding wave received at the wave receiver, the amount of the preceding wave being energy integrated over a period corresponding to the preceding distance range, the amount of the succeeding wave being energy integrated over a period corresponding to the succeeding distance range,
 the distance measuring unit being configured to calculate the distance to the target based on a ratio of the amount of the preceding wave and the amount of the succeeding wave.

2. The distance measuring device of claim 1, wherein the measuring wave is light.

3. The distance measuring device of claim 1, wherein the wave receiver includes:
 a plurality of pixels arranged two-dimensionally and configured to receive the measuring wave; and
 a pixel output unit configured to output a pixel signal based on an amount of the measuring wave received by each of the plurality of pixels.

4. The distance measuring device of claim 3, wherein the distance measuring unit is configured to calculate, by defining that a cycle time in which the pixel output unit outputs a plurality of the pixel signals corresponding to the respective distance ranges is one frame, the distance to the target on a frame-by-frame basis.

5. The distance measuring device of claim 1, wherein the distance measuring unit includes:
 a range determining unit configured to determine the preceding distance range and the succeeding distance range, across which the target is present, among the plurality of distance ranges; and
 a range distance calculating unit configured to calculate the distance to the target based on the amount of the preceding wave and the amount of succeeding wave.

6. The distance measuring device of claim 5, wherein the range determining unit is configured to determine a particular one of the plurality of distance ranges, in which an amount of the waves received at the wave receiver over a period corresponding to the particular distance range is equal to or greater than a threshold value, to be the particular distance range in which the target is present.

7. The distance measuring device of claim 6, wherein the threshold value varies from one of the plurality of distance ranges to another such that the longer the distance from the wave receiver to a distance range is, the smaller the threshold value for the distance range is.

8. The distance measuring device of claim 5, wherein
 the wave transmitter is configured to transmit, as the measuring wave, a first measuring wave and a second measuring wave that have mutually different transmitted wave strengths, the range determining unit is configured to determine the preceding distance range and the succeeding distance range based on an amount of the first measuring wave received at the wave receiver, and the range distance calculating unit is configured to calculate the distance to the target based on an amount of the second measuring wave received as the preceding wave at the wave receiver over a period corresponding to the preceding distance range and an amount of the second measuring wave received as the succeeding wave at the wave receiver over a period corresponding to the succeeding distance range.

9. A distance measuring system comprising:
the distance measuring device of claim 1;
the wave transmitter; and
the wave receiver.

10. A distance measuring method for calculating a distance to a target based on a time interval between transmission of a measuring wave from a wave transmitter and reception of the measuring wave at a wave receiver, the distance measuring method including calculating, when the target is present across a preceding distance range and a succeeding distance range which are continuous with each other and both of which belong to a plurality of distance ranges defined by dividing a measurable distance range, the distance to the target based on an amount of a preceding wave received at the wave receiver and an amount of a succeeding wave received at the wave receiver, the amount of the preceding wave being energy integrated over a period corresponding to the preceding distance range, the amount of the succeeding wave being energy integrated over a period corresponding to the succeeding distance range, the distance measuring method including calculating the distance to the target based on a ratio of the amount of the preceding wave and the amount of the succeeding wave.

11. A non-transitory computer-readable storage medium storing a computer program designed to cause a computer system to execute the distance measuring method of claim 10.

* * * * *